United States Patent [19]

Kobayashi et al.

[11] Patent Number: 4,855,782
[45] Date of Patent: Aug. 8, 1989

[54] DISPLAY DEVICE FOR INDICATING THE SETTING OF A ZOOM LENS

[75] Inventors: Takeo Kobayashi; Norio Numako, both of Tokyo, Japan

[73] Assignee: Asahi Optical Co. Ltd., Tokyo, Japan

[21] Appl. No.: 180,813

[22] Filed: Apr. 12, 1988

[30] Foreign Application Priority Data

Apr. 13, 1987 [JP] Japan .............................. 62-55830[U]

[51] Int. Cl.⁴ ....................... G03B 17/20; G03B 13/12
[52] U.S. Cl. .............................. 354/475; 354/195.13; 354/222; 354/289.1
[58] Field of Search ............... 354/409, 465, 471, 474, 354/475, 195.13, 219, 222, 289.1

[56] References Cited

U.S. PATENT DOCUMENTS

| | | | |
|---|---|---|---|
| 4,478,493 | 10/1984 | Yokota | 354/222 |
| 4,529,283 | 7/1985 | Oshima et al. | 354/222 |
| 4,639,111 | 1/1987 | Harvey | 354/222 |
| 4,652,104 | 3/1987 | Harvey | 354/222 |
| 4,682,870 | 7/1987 | Atkinson | 354/222 |

FOREIGN PATENT DOCUMENTS

| | | | |
|---|---|---|---|
| 0002925 | 1/1985 | Japan | 354/219 |
| 0160728 | 7/1986 | Japan | 354/222 |

Primary Examiner—Russell E. Adams
Attorney, Agent, or Firm—Sandler & Greenblum

[57] ABSTRACT

A display device in a camera with a zoom lens, for providing a visual indication of the setting of the zoom lens. It includes a zoom encoder (10) for detecting the zoom lens setting, a liquid crystal display (8) having a plurality of display segments (S1–S15) disposed in an arcuate pattern, and drive circuits (24, 25) for driving the display segments. A micro-computer (20) controls the drive circuits, based on the zoom setting as detected by the zoom encoder (10), such that the state of each of the display segments can be changed by the drive circuits in response to a change in the angle of view of the zoom lens.

The display device can provide an intuitively perceivable visual indication with the arcuate array of display segments (S1–S15).

16 Claims, 6 Drawing Sheets

| SEGMENT No. | 1 | 2 3 | 4 5 | 6 7 | 8 9 | 10 11 | 12 13 | 14 15 | 16 |
|---|---|---|---|---|---|---|---|---|---|
| FOCAL LENGTH LOCK | 0 | 0 | 0 | 0 | 0 | 0 | 0 | 0 | 0 |
| 35mm | 1 | 1 | 1 | 1 | 1 | 1 | 1 | 1 | 0 |
| 40mm | 1 | 1 | 1 | 1 | 1 | 1 | 1 | 0 | 0 |
| 45mm | 1 | 1 | 1 | 1 | 1 | 1 | 0 | 0 | 0 |
| 50mm | 1 | 1 | 1 | 1 | 1 | 0 | 0 | 0 | 0 |
| 55mm | 1 | 1 | 1 | 1 | 0 | 0 | 0 | 0 | 0 |
| 60mm | 1 | 1 | 1 | 0 | 0 | 0 | 0 | 0 | 0 |
| 65mm | 1 | 1 | 0 | 0 | 0 | 0 | 0 | 0 | 0 |
| 70mm | 1 | 0 | 0 | 0 | 0 | 0 | 0 | 0 | 0 |
| MACRO | 1 | 0 | 0 | 0 | 0 | 0 | 0 | 0 | 1 |

DISPLAY DEVICE FOR INDICATING THE SETTING OF A ZOOM LENS

FIELD OF THE INVENTION

The present invention relates in general to a display device for cameras with zoom taking lenses, such as still cameras or video cameras, and in particular to a display device for displaying an image of the angle of view which is variable by zooming.

PRIOR ART

Cameras are known which have taking lens systems with a zooming function. Examples of them include single-lens reflex cameras having a zoom lens mounted on the body thereof, and a zooming leaf-shutter camera which the applicant has proposed.

Such cameras with zoom lenses have in general numerical or linear marks provided on the lens barrel, which indicate the focal length, the magnification or the angle of view depending on the angular position or longitudinal extension of the lens barrel.

The above-described indicating means, however, are not very convenient in that the user must select and read one of a plurality of numerical or linear marks in order to know the zoom lens setting and it is therefore difficult for him to perceive with an intuitive image the zoom lens setting.

SUMMARY OF THE INVENTION

The present invention has been made to overcome the above-described inconvenience. An object of the invention is therefore to provide a display device for indicating the setting of a zoom lens, which enables the user to intuitively perceive the zoom lens setting.

To achieve the above-described object, a display device according to the present invention comprises: detecting means for detecting the setting of a zoom lens which is variable by zooming action; display means having a plurality of segments disposed in an arcuate pattern; driving means for driving the segments of the display means; and control means for controlling, depending on the setting as detected by the detecting means, the driving means to drive each segment depending on the current angle of view of the zoom lens, as shown in FIG. 1.

The invention will now be described, by way of example, with reference to the accompanying drawings, in which:

FIG. 8 is a block diagram of the embodiment of the display device;

FIG. 9 is a table showing zoom settings and corresponding ON/OFF of the segments of the liquid crystal display.

DESCRIPTION OF A PREFERRED EMBODIMENT

A description will be given below of an embodiment of the zoom setting display device according to the present invention. The embodiment is incorporated in a leaf-shutter camera having a zoom lens.

Firstly, the arrangement of the camera will schematically be described with reference to FIGS. 2 through 5.

The camera comprises a body 3 provided with a stroboscope 1, a viewfinder 2 and other devices. The camera further comprises a lens barrel 4 which is mounted on the body 3 and which has a taking lens (not shown) mounted therein.

Figure 1:
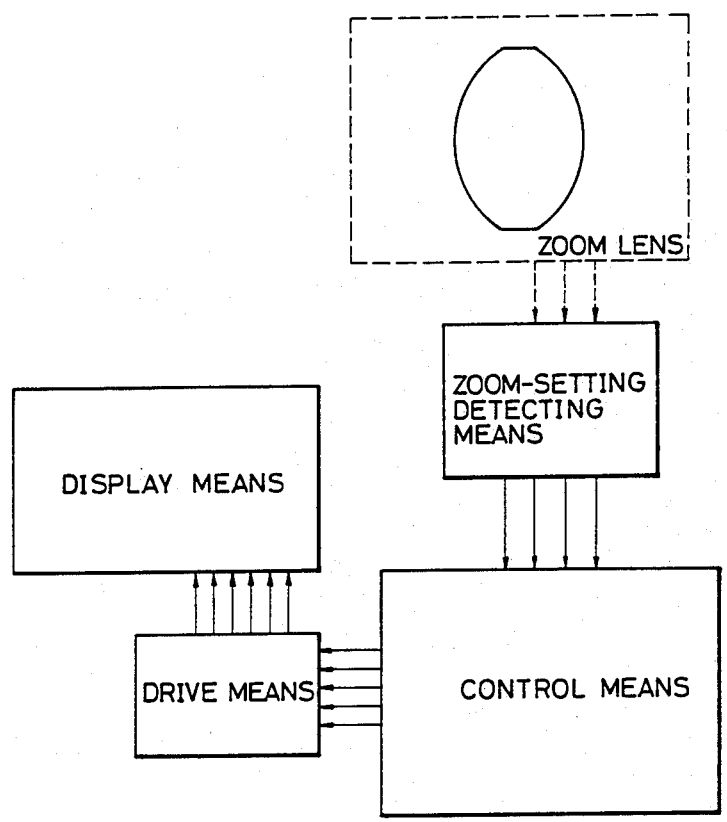
FIG. 1 is a block diagram schematically showing the zoom setting display device according to the present invention.
Figure 2:
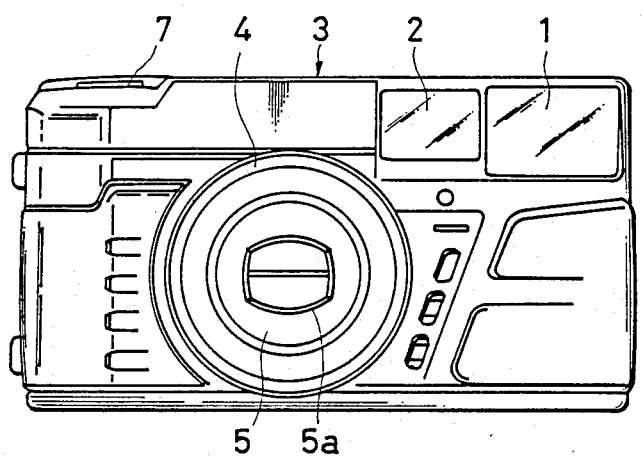
FIG. 2 is a front view of a camera provided with an embodiment of the display device according to the present invention.
Figure 3:
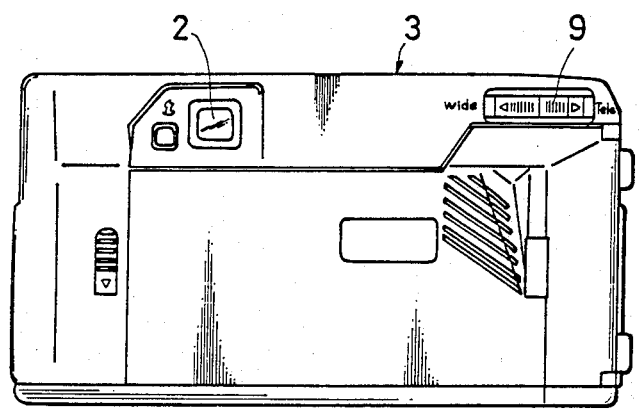
FIG. 3 is a rear view of the camera.
Figure 4:
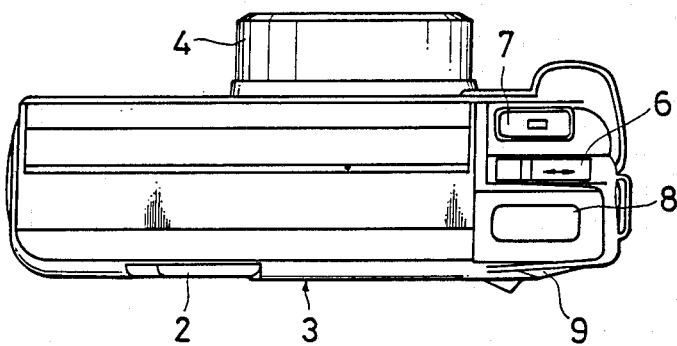
FIGS. 4 and 5 are plan views of the camera.
Figure 5:
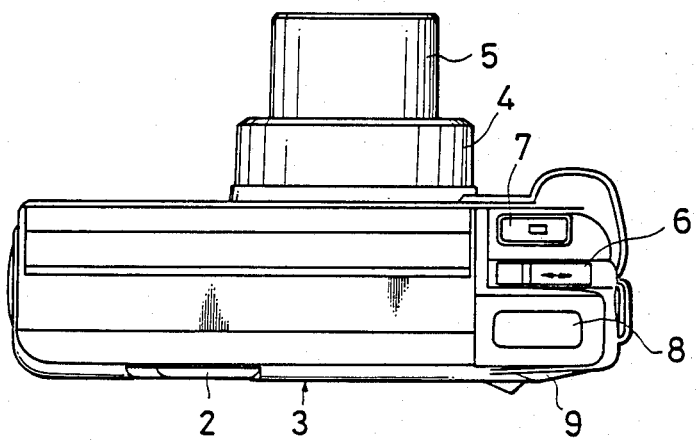

The taking lens is a zoom lens comprising front and rear sets of lens elements. The setting of the zoom lens can be changed by moving the sets of lens elements relative to each other along the optical axis. The front set of lens elements is secured within a movable lens barrel 5 located in the lens barrel 4. The movable barrel 5 can be freely moved by rotating a cam ring (not shown) provided in the lens barrel 4, between an innermost retracted position, or locked position, shown in FIG. 4, and an outermost extended position, or macro position, shown in FIG. 5. Said cam ring is driven by a zoom motor for rotation. In this embodiment, the focal length of the zoom lens is variable from 35 mm to 70 mm. The camera is provided with lens cover 5a which is adapted to automatically cover the front side of the lens in response to the movable lens barrel 5 being retracted to the locked position, as shown in FIG. 2.

The body 3 has a main switch 6, a release switch 7 and a liquid crystal display (hereinafter abbreviated as LCD) 8 as the display means provided on the top surface thereof, and further has a zoom switch 9 provided on the back thereof.

These switches 6, 7, 9 are respectively connected through a control circuit to the zoom motor, a photometer and range finder, and a step motor adapted both for releasing the shutter and for automatic focusing action. The main switch 6 is a slide switch which can be positioned at three different positions, namely, OFF-position, zoom-position and macro-position. The release switch 7 is a push button switch which is adapted to initiate photometric and range finding actions of the camera in response to a single-step push, and further to effect a shutter release in response to a double-step push, on condition that the main switch 6 is in the zoom-position or in the macro-position. The zoom switch 9 is a slide switch which is adapted to take a neutral (or OFF) position when it is left free, and is turned on in a wide angle mode or in a telephoto mode in response to the user's manual operation. The switch 9, when turned on, will cause the zoom motor to rotate in one direction or in the reversed direction on condition that the main switch 6 is in the zoom-position.

Figure 6:
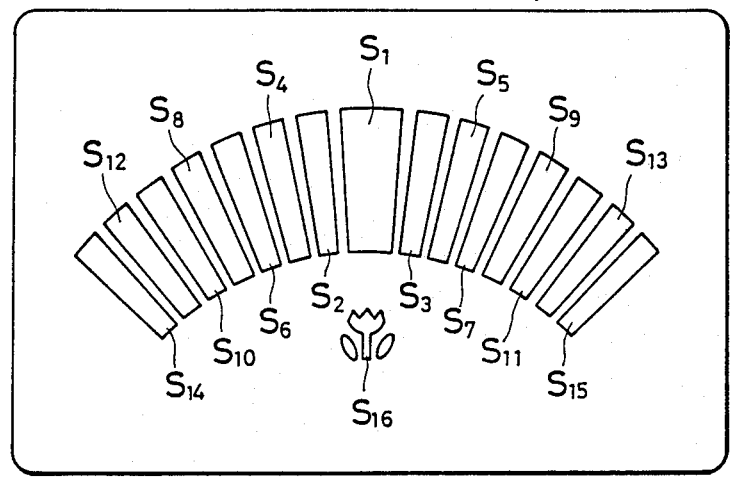
FIG. 6 is a schematic enlarged view of a liquid crystal display (LCD) used in the display device.

The LCD 8 will operate when the main switch 6 is on. It is provided with a plurality of segments S1–S15 disposed in an arcuate pattern, and another tulip-shaped segment S16 for indicating the macrosetting, as shown in FIG. 6. These segments are rendered on or off to indicate an image of the angle of view which is variable with the zoom setting.

Figure 7:
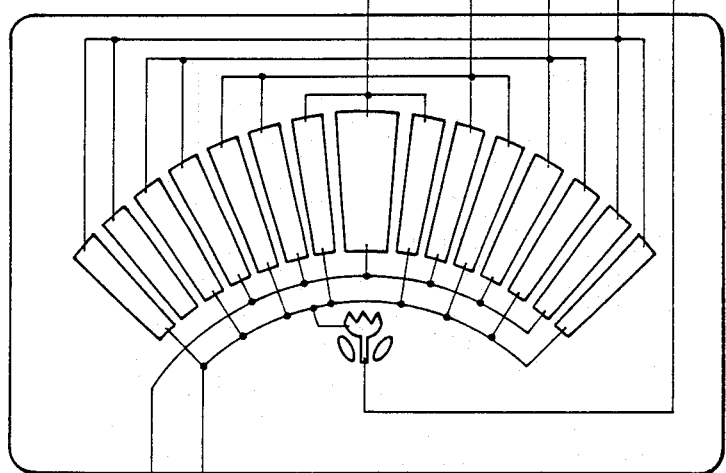
FIG. 7 is a view similar to FIG. 6 and shows the electrical connection between each segment of the LCD and electrodes.

The above-described segments S1–S16 are connected to two common electrodes Com1 and Com2 and to five segment electrodes Seg1–Seg5, as shown in FIG. 7. As will be understood from such figure, a pair of segments S2 and S3 are connected such that they are turned on or off simultaneously. Similarly, segment pairs of S4 and S5; S6 and S7; S8 and S9; S10 and S11; S12 and S13; and S14 and S15 are each turned on or off simultaneously.

The LCD 8 with those electrodes is connected to and driven by a ½-duty dynamic drive circuit shown in FIG. 8.

The display device according to the invention will further be described with reference to FIG. 8.

The circuit shown includes detecting means in the form of a zoom encoder 10 for detecting the zoom setting, and driving and controlling means in the form of a single-chip micro-computer with an LCD driver 20 for driving the LCD 8 in accordance with a signal from the zoom encoder 10.

The zoom encoder 10 comprises a coding plate secured to the circumference of said cam ring for moving the movable lens barrel 5, for example, and several brushes slidable on such coding plate and variable in conduction with the angular position of the cam ring.

The single-chip micro-computer 20 comprises a central processing unit (CPU) 21, a multiplexer 22, a timing pulse generating circuit 23, and driver circuits 24, 25, ... for the respective electrodes.

The CPU 21 detects the axial position of the movable lens barrel 5 through the conducion of the brushes, which axial position corresponds to the angular position of the cam ring, thereby to derive data on the setting of the zoom lens, i.e. those data which indicates either one of the positions (namely, the locked position, macro-position and intermediate zoom setting position between the locked and macro-positions) where the zoom lens is located. Based on such data, and in accordance with some criteria to be described, the CPU 21 determines which segments of the LCD 8 to turn on or off.

The common electrode driver circuit 24 will apply the voltage from a voltage generating circuit 26 to the common electrodes Com1 and Com2 alternately, depending on the clock pulses from the timing pulse generator 23.

The multiplexer 22 will multiplex the data from the bits S1-S9 of a random access memory (RAM) inside the CPU 21 depending on said clock pulses in synchronism with the output from the common electrode driver 24, whereby the data is supplied in the form of five separate signals to the segment electrode driver 25. The segment electrode driver 25 in turn will apply the voltage from the voltage generating circuit 26 to the segment electrodes Seg1-Seg5 in conformity to the signals from the multiplexer 22.

The segments of the LCD 8 are turned on or off for displaying specified information in conformity to the voltages applied thereto by those drivers 24 and 25.

FIG. 9 shows a table providing the criteria for turning the display segments on or off depending on the focal length of the zoom lens. In the table, "1" represents turning-on and "0" turning-off.

The particular segment S1 located in the center is always turned on in response to the main switch 6 being closed. Other display segments S2-S15 are turned on or off depending on the angle of view of the zoom lens. For longer focal lengths, i.e. for narrower angles of view, only those segments adjacent the center are turned on, while for shorter focal lengths, i.e. for wider angles of view, peripheral segments are turned on in addition to the nearcenter segments. The remaining segment S16 is turned on in response to the zoom lens being set to macro-setting.

Further, as will be understood from the table, the segments S2-S15 are arranged such that they provide in any case a visual indication symmetric with respect to S1, in which, when corresponding two peripheral segments on opposite sides of the central segment S1 are turned on, all the inner segments between the peripheral ones are turned on at the same time.

Next, the operation of the zoom setting display device thus constructed, will be described together with the operation of the camera.

Firstly, when the main switch is in its OFF position, the movable lens barrel 5 is always retracted to the locked position and the lens cover 5a is closed. In these conditions, the operator's action on the release switch 7 or the zoom switch 9 will not result in any operation of the camera, no indication being displayed on the LCD 8.

In response to the main switch 6 being set to the zoom position, the movable lens barrel 5 is one step extended from the locked position and the release switch 7 and zoom switch 9 are unlocked.

In these conditions, the operator's action on the zoom switch 9 will cause the zoom motor to rotate in one direction or in the reversed direction, whereby the movable lens barrel 5 is further extended or retracted, changing the focal length of the zoom lens between 35 mm and 70 mm.

Figure 10:
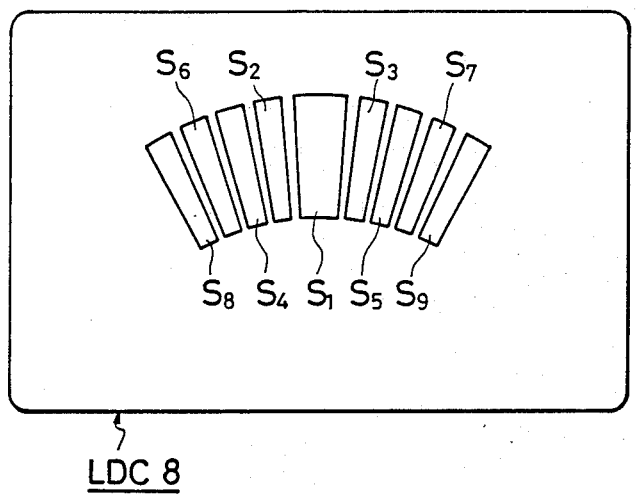
FIGS. 10 and 11 are views showing examples of indications given by the liquid crystal display.

In these conditions, an image or indication of the angle of view is displayed on the LCD 8. The indication will change with the zoom setting as determined by the operator's action on the zoom switch 9. When the focal length is set to 50 mm, for example, segments S1–S9 are energized, as shown in FIG. 10.

In response to the main switch 6 being set to the macro-position, the movable lens barrel 5 is always extended to the macro-position. With the barrel 5 in the macro-position, the focal length is fixed to 70 mm, while the zoom switch 9 is not operable but the release switch 7 is operable.

Figure 11:
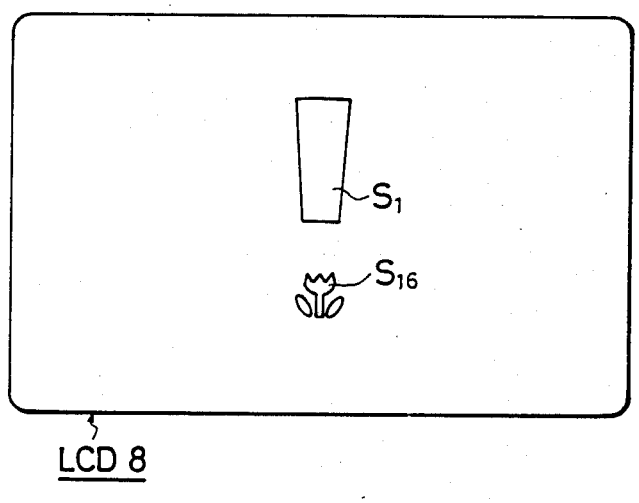

In these conditions, the segment S1 and the tulip-shaped segment S16 are energized for an indication of the macro-position, as shown in FIG. 11.

The above described embodiment is provided with a liquid crystal display as the display means whose symmetrically disposed display segments are turned on from the central one toward the peripheral ones as the angle of view widens. The present invention, however, is not limited to such embodiment, and other arrangements are also possible, in which display elements may be turned off from a central one or ones toward peripheral ones. Light emitting diode cells may also be used as the display means.

Further, the display means of the embodiment described and shown is a separate single-function device for a single function of indicating the zoom setting. The display means may also be provided in a multiple function display for indicating the shutter speed, aperture value, ISO value, etc. It may also be located at any portion of the camera, other than the top surface thereof, e.g. on the back of the camera body or inside the viewfinder.

Further, in the above-described embodiment, the present invention is applied to a leaf shutter camera. The present invention is also applicable not only to single-lens reflex cameras but also to 8-mm cameras and video cameras As described above, since the zoom setting display device according to the present invention is capable of electrically indicating an image of the angle of view which is variable with the zoom setting, it allows the user to intuitively perceive the zoom setting.

What is claimed is:

1. A zoom setting display device in a camera provided with a zoom lens, comprising:
   zoom-setting detecting means for detecting the zoom setting of said zoom lens which is variable by zooming operation;
   display means having a plurality of display segments disposed in an arcuate pattern;
   driving means for driving each of said display segments individually; and
   control means for controlling, on the basis of the zoom setting as detected by said detecting means, said driving means so that the state of each of said segments can be changed by the driving action of said driving means in response to a change in the angle of view of said zoom lens.

2. A zoom setting display device as claimed in claim 1, wherein said display means has a central display segment and a plurality of display segments symmetrically disposed on both sides of the central segment.

3. A zoom setting display device as claimed in claim 2, wherein said control means comprises means for controlling said driving means on the basis of the zoom setting as detected by the detecting means, in such a manner that the driven range changes sequentially, and in a symmetrical fashion, between the central segment and the peripheral segments in relation to the change in the angle of view of said zoom lens.

4. A zoom setting display device as claimed in claim 2, wherein said control means comprises means for controlling said driving means on the basis of the zoom setting as detected by the detecting means, in such a manner that the driven range widens sequentially, in a symmetrical fashion, from the central segment toward peripheral segments as the angle of view of the zoom lens widens.

5. A zoom setting display device as claimed in claim 1, wherein:
   the display means includes an additional segment situated away from the arcuate pattern of said plurality of display segments;
   said control means comprises means for controlling said driving means on the basis of the zoom setting as detected by the detecting means, in such a manner that the driven range widens sequentially and in a symmetric manner from a central segment of said plurality of display segments toward peripheral segments of said plurality of segments as the angle view of the zoom lens widens, and that in a macro-position of said zoom lens only an additional display segment situated away from the arcuate pattern of said plurality of display segments is driven.

6. A zoom setting display device as claimed in claim 1, wherein said display means comprises a liquid crystal display.

7. A zoom lens setting display device as claimed in claim 1, wherein said display means comprises light emitting diodes.

8. A zoom setting display device as claimed in claim 2, wherein said display means comprises a liquid crystal display.

9. A zoom setting display device as claimed in claim 3, wherein said display means comprises a liquid crystal display.

10. A zoom setting display device as claimed in claim 4, wherein said display means comprises a liquid crystal display.

11. A zoom lens setting display device as claimed in claim 2, wherein said display means comprises light emitting diodes.

12. A zoom lens setting display device as claimed in claim 3, wherein said display means comprises light emitting diodes.

13. A zoom lens setting display device as claimed in claim 4, wherein said display means comprises light emitting diodes.

14. A zoom setting display device in a camera provided with a zoom lens, comprising:
   zoom-setting detecting means for detecting the zoom setting of said zoom lens, which is variable by a zooming operation;
   display means having a plurality of display segments disposed in an arcuate pattern;
   driving means for driving said display segments; and
   control means for controlling, on the basis of the zoom setting detected by said detecting means, said drive means so that the state of each of said segments can be changed by driving action of said driving means in response to a change in the angle of view of said zoom lens caused by a zooming operation.

15. A zoom setting display device in a camera provided with a zoom lens, comprising:
   zoom-setting detecting means for detecting the zoom setting of said zoom lens, which is variable by a zooming operation;
   display means disposed in a pattern representative of a maximum angle of view of said zoom lens;
   driving means for driving said display means; and
   control means for controlling, on the basis of the zoom setting detected by said detecting means, said drive means so that the state of said display means can be changed by driving action of said driving means, in response to a change in the angle of view of said zoom lens caused by a zooming operation.

16. A zoom setting display device in accordance with claim 15, wherein said display means comprises a plurality of display segments disposed in said pattern, and further wherein the state of each of said display segments can be changed by the driving action of said driving means.

* * * * *